G. E. Clarke,
Cage Trap,

№ 60,143. Patented Dec. 4, 1866.

Witnesses.
J. L. Coburn
J. W. Harthis

Inventor.
Greville E. Clarke
by Coburn & Mann attorneys

United States Patent Office.

IMPROVEMENT IN ANIMAL TRAPS.

GREVILLE E. CLARKE, OF RACINE, WISCONSIN.

Letters Patent No. 60,143, dated December 4, 1866.

SPECIFICATION.

TO ALL WHOM IT MAY CONCERN:

Be it known that I, GREVILLE E. CLARKE, of the city of Racine, in the county of Racine, and State of Wisconsin, have invented a new and useful Improvement in Animal Traps; and I do hereby declare and make known that the following is a full, clear, and exact description of the same, reference being had to the accompanying drawings, and the letters and figures marked thereon, which form part of this specification.

The object of my said invention is to produce a trap especially adapted to catching such animals and birds as are gregarious in their habits and go in droves and flocks; and to this end my said invention consists in so constructing and arranging a trap that when set it may be so adjusted as to allow any desired number of animals or birds to enter or pass out without unsetting or closing the trap, but which, at the desired or predetermined moment, instantaneously closes and secures within it as many or nearly as many animals or birds as were contemplated in setting and adjusting the trap.

To enable those skilled in the art to understand how to make and use my said invention, I will proceed to describe the construction and operation of the same with particularity, making reference, in so doing, to the aforesaid drawings, in which—

Figure 2:
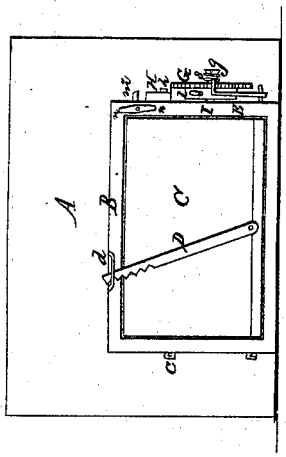
Figure 4:
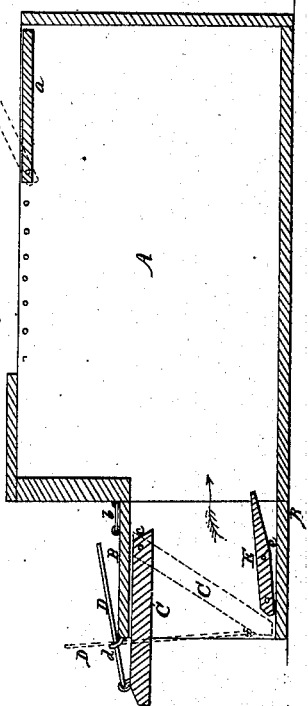
Figure 1:
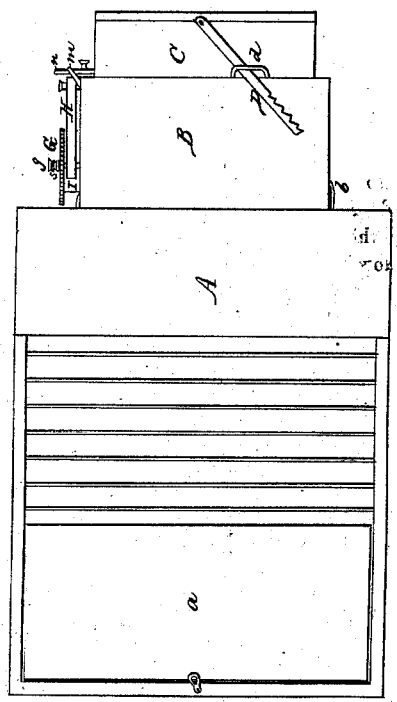
Figure 3:
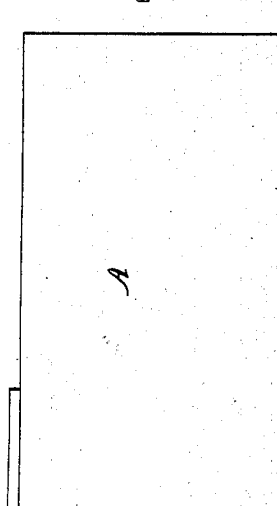

Figure 1 is a plan or top view of my invention.
Figure 2 is an end view or elevation thereof.
Figure 3 is a side elevation of the same; and
Figure 4 is a longitudinal vertical section thereof.
Similar letters of reference in the several figures denote the same parts of my invention.

A represents a box or bin, to which the trap is attached by means of hooks, as shown, or in any other suitable and convenient manner. This box, which is designed to receive and contain the animals or birds entrapped, may be made expressly for the purpose, and provided with a suitable hinged or other door, a, through which the animals may be taken out, or the trap proper may be attached to any box or cask, which will serve the same purpose. B represents the box or enclosure of the operating parts of my invention, which is attached to the box, A, or its equivalent, as shown, a hole being cut into the side of the receiving box corresponding with the open rear of the trap, so that the animal entering the door of the trap passes directly into the receiving box A, as shown in fig. 4. C represents the door of the trap, which is pivoted or hinged at c, so as to swing or open upwards, as indicated in figs. 1, 3, and 4, and to close down in an inclined position, as indicated in fig. 2 and the dotted lines in fig. 4. When the trap is set the door is kept open by means of a pivoted latch, n, one end of which lies under the edge of the door, and the other end under a stationary stop, m, upon the end of the trap, as shown, said latch being susceptible of sliding laterally upon its pivot far enough to pass from beneath the stop m, when desired. To the edge of said swinging door C is attached an arm, D, which passes through a rest or loop of wire or other suitable material, marked d, upon the front edge of the top of the trap, said arm inclining to one side and being provided with a series of ratchet-teeth, which catch upon the rest d, and thus prevent the door from being opened by pressure against it from within. E represents a platform arranged in the bottom of the trap, as shown, being suspended upon centrally arranged pivots, e, at each end, so as to have a rocking or oscillating movement upon its said supports, as is hereinafter described. At the front edge of said platform, E, and at one end, there is attached, in any suitable manner, a bar, F, arranged in a nearly vertical position, its upper end inclining upon the periphery of a ratchet-wheel, G, and operating as a pawl thereupon, as hereinafter specified. The said ratchet-wheel is supported by a shaft, g, fixed in the end of the trap, and having a head upon its outer end, so that a spring, s, is arranged between said head and the face of the ratchet-wheel, as shown. Upon the inner face of the said ratchet-wheel there is secured, so as to turn with it, a drum of less diameter, marked I, from which projects, radially, a pin, l, which, as the ratchet-wheel revolves, strikes upon and raises one end of the lever H, which is pivoted at h, so that the raising of one end of said lever by the pin l moves the opposite end thereof against the latch n, so as to move it out laterally upon its pivot, as before mentioned.

Having described the nature and construction of my said invention, I will now describe its operation: The trap having been set, as indicated in figs. 1, 3, and 4, the ratchet-wheel being so adjusted as to permit the required number of movements to the platform E, before bringing the pin l in contact with the lever H, which regulates the number of animals which may pass in or out singly before the trap will close, as the first one cautiously enters to find himself uninjured, thus raising the pawl F and moving the ratchet-wheel one notch;

after feeding upon the bait he returns uninjured and without closing the trap; his companions, inferring that all is safe, enter without fear, and in numbers, until pin $l$ raises the lever H, and moves the latch $n$ from its support, $m$, when the door, C, drops into the position shown in fig. 2, and in dotted lines in fig. 4, the teeth upon the arm D preventing the door from yielding upwards by any pressure which may be brought against it from within. As said door is closing, if it should chance that an animal should be escaping so that the lower edge of the door should rest upon its back, its weight would close it down immediately behind, so as to prevent others from escaping from the trap.

Having described the construction and operation of my invention, I will now specify what I claim and desire to secure by Letters Patent:

1. I claim the combination of the pivoted platform E, and the arm F, arranged and operating substantially as and for the purposes described.

2. I claim, in combination with said platform E and arm F, the ratchet-wheel G, provided with a finger, $l$, operating substantially as specified.

3. In combination with said ratchet-wheel G, I claim the arrangement of the spring $s$, to hold the wheel from moving back while the arm F recedes, in the manner described.

4. I claim the combination of the spur-wheel G, provided with the pin $l$ and the lever H, arranged and operating substantially in the manner and for the purposes described.

GREVILLE E. CLARKE.

Witnesses:
    D. McDonald,
    Elbert O. Hand.